United States Patent
Shirai (10) Patent No.: US 8,770,657 B2
(45) Date of Patent: Jul. 8, 2014

(54) RESIN ROOF MOUNTING STRUCTURE

(75) Inventor: Yasuhiro Shirai, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 13/878,770

(22) PCT Filed: Oct. 26, 2010

(86) PCT No.: PCT/JP2010/069008
§ 371 (c)(1),
(2), (4) Date: Apr. 11, 2013

(87) PCT Pub. No.: WO2012/056521
PCT Pub. Date: May 3, 2012

(65) Prior Publication Data
US 2013/0200657 A1    Aug. 8, 2013

(51) Int. Cl.
*B62D 25/06* (2006.01)
*B62D 25/07* (2006.01)
*B62D 25/02* (2006.01)

(52) U.S. Cl.
CPC ............... *B62D 25/06* (2013.01); *B62D 25/07* (2013.01); *B62D 25/02* (2013.01)
USPC ...................... 296/210; 296/213; 296/203.03

(58) Field of Classification Search
CPC ......... B62D 25/02; B62D 25/06; B62D 25/07
USPC ........... 296/210, 213, 203.03, 203.01, 193.05
See application file for complete search history.

(56) References Cited

U.S. PATENT DOCUMENTS

| | | | |
|---|---|---|---|
| 6,318,797 B1* | 11/2001 | Bohm et al. | 296/210 |
| 6,367,871 B2* | 4/2002 | Grimm et al. | 296/210 |
| 6,409,258 B1* | 6/2002 | Grimm et al. | 296/216.08 |
| 6,517,147 B2* | 2/2003 | Grimm | 296/210 |
| 6,672,655 B2 | 1/2004 | Zinsmeister et al. | |
| 6,860,548 B2* | 3/2005 | Bohm et al. | 296/210 |
| 7,815,246 B2* | 10/2010 | Nakamura et al. | 296/190.08 |
| 2003/0011213 A1 | 1/2003 | Zinsmeister et al. | |

FOREIGN PATENT DOCUMENTS

| | | |
|---|---|---|
| EP | 1 275 577 A2 | 1/2003 |
| EP | 1 386 828 A2 | 2/2004 |
| FR | 2 887 216 | 12/2006 |
| JP | A-11-91639 | 4/1999 |
| JP | A-2008-68762 | 3/2008 |

* cited by examiner

*Primary Examiner* — Dennis H Pedder
(74) *Attorney, Agent, or Firm* — Oliff PLC (57) ABSTRACT

A roof panel made of resin has lower flange portions that are bent toward a vehicle lower side from vehicle side end portions of a upper surface portion. Outer panels that structure roof side rails have groove portions that are concave and are formed along a vehicle longitudinal direction at vehicle transverse direction inner sides of curved surface portions, and inner side flange portions that are formed at final end portions that are further toward vehicle transverse direction inner sides than the groove portions. In a state in which the lower flange portions are disposed within the groove portions of the outer panels, the inner side flange portions of the outer panels and an inner surface of the upper surface portion of the roof panel are joined by an adhesive.

4 Claims, 10 Drawing Sheets

RESIN ROOF MOUNTING STRUCTURE

TECHNICAL FIELD

The present invention relates to a resin roof mounting structure.

BACKGROUND ART

In following Patent Document 1, there is disclosed a structure in which flange portions, that are substantially in the horizontal direction and are formed at vehicle transverse direction outer side end portions of a resin roof, are placed on roof side flange portions that are formed by bending, in the vehicle transverse direction, vertical wall portions that are at the vehicle transverse direction inner sides of roof side rails, and the roof side flange portions and the flange portions of the resin roof are joined.

[Patent Document 1] Japanese Patent Application Laid-Open No. 2008-068762

DISCLOSURE OF INVENTION

Technical Problem

In the structure disclosed in aforementioned Patent Document 1, the regions at which the flange portions of the resin roof are placed on the roof side flange portions of the roof side rails are sunken-in toward the vehicle lower side, between the general surface of the resin roof and the outer side surfaces of the roof side rails. At these sunken-in positions, the roof side flange portions and the flange portions of the resin roof are joined by an adhesive or the like. Therefore, measures for waterproofing are required because the adhered regions of the roof side flange portions and the flange portions of the resin roof are directly exposed to rain water and the like.

In view of the above-described circumstances, an object of the present invention is to provide a resin roof mounting structure that can suppress exposure to water of the joined portions of a resin roof and roof side rails.

Solution to Problem

A resin roof mounting structure of a first aspect relating to the present invention is a structure comprising: a resin roof that is provided at a vehicle upper portion along a vehicle transverse direction and a vehicle longitudinal direction, and that has, at vehicle side portion final ends, flange portions that are bent toward a vehicle lower side or a vehicle upper side; roof side rails that are provided at upper end portions of vehicle side portions, and that extend in the vehicle longitudinal direction along side end portions of the resin roof; groove portions that are concave and are provided along the vehicle longitudinal direction at vehicle transverse direction inner side end portions of outer panels that structure the roof side rails, the flange portions being disposed within the groove portions; joined portions that are provided at final end portions of the outer panels, which final end portions are further toward vehicle transverse direction inner sides than the groove portions, and that are joined to an inner surface of the resin roof in a state in which the flange portions are disposed within the groove portions; and abutment surfaces that are provided between the groove portions and the joined portions in the vehicle transverse direction of the outer panels, that project out toward the vehicle upper side, and that abut the inner surface of the resin roof.

A resin roof mounting structure of a second aspect relating to the present invention is a structure in which, in the resin roof mounting structure of the first aspect, the flange portions are lower flange portions at which vehicle side end portions of the resin roof are bent toward the vehicle lower side, and the groove portions are shaped, in cross-section, as hats at which the outer panels are recessed toward the vehicle lower side.

A resin roof mounting structure of a third aspect relating to the present invention is a structure in which, in the resin roof mounting structure of the first aspect, the flange portions are upper flange portions at which vehicle side end portions of the resin roof are bent toward the vehicle upper side, and the groove portions are shapes in which vertical wall portions, that are provided at the outer panels, are recessed toward vehicle transverse direction outer sides.

A resin roof mounting structure of a fifth aspect relating to the present invention is a structure in which, in the resin roof mounting structure of the third aspect, concave portions, that are recessed further toward the vehicle lower side than the joined portions, are provided along the vehicle longitudinal direction at lower portions of the groove portions.

In accordance with the resin roof mounting structure of the first aspect relating to the present invention, the flange portions, that are bent toward the vehicle lower side or the vehicle upper side, are provided at the vehicle side portion final ends of the resin roof that is provided at the vehicle upper portion. At the upper end portions of the vehicle side portions, the roof side rails extend in the vehicle longitudinal direction along the side end portions of the resin roof, and the concave groove portions are provided along the vehicle longitudinal direction at the vehicle transverse direction inner side end portions of the outer panels that structure the roof side rails. Further, in the state in which the flange portions of the resin roof are disposed within the groove portions of the outer panels, the joined portions, that are provided at the final end portions that are further toward the vehicle transverse direction inner sides than the groove portions of the outer panels, are joined to the inner surface of the resin roof. Namely, the joined portions of the outer panels are joined to the inner surface of the resin roof further toward the vehicle transverse direction inner sides than the concave groove portions of the outer panels. Therefore, the joined portions being exposed to water is suppressed, and a special waterproofing processing is not needed.

Further, the abutment surfaces, that project out toward the vehicle upper side and abut the inner surface of the resin roof, are provided between the groove portions and the joined portions in the vehicle transverse direction of the outer panels. Therefore, water crossing-over the abutment surfaces from the groove portions and penetrating into the joined portions of the outer panels is suppressed more reliably.

In accordance with the resin roof mounting structure of the second aspect relating to the present invention, the joined portions, that are further toward the vehicle transverse direction inner sides than the groove portions of the outer panels, are joined to the inner surface of the resin roof in a state in which the lower flange portions, at which the vehicle side end portions of the resin roof are bent toward the vehicle lower side, are disposed within the groove portions that are shaped as hats in cross-section that are recessed toward the vehicle lower side of the outer panels. The groove portions are provided along the vehicle longitudinal direction, and the water, that has penetrated into the groove portions, can be drained in the vehicle longitudinal direction. Therefore, the joined portions, that are further toward the vehicle transverse direction inner sides than the groove portions, being exposed to water is suppressed more effectively. Further, the resin roof can be installed on the roof side rails from the vehicle upper side, and the lower flange portions of the resin roof can be inserted into the groove portions of the outer panels, and assembly of the resin roof is easy.

In accordance with the resin roof mounting structure of the third aspect relating to the present invention, there are provided the groove portions that are shapes in which the vertical wall portions of the outer panels are recessed toward the vehicle transverse direction outer sides. The joined portions, that are further toward the vehicle transverse direction inner sides than the groove portions of the outer panels, are joined to the inner surface of the resin roof in a state in which the upper flange portions, at which the vehicle side end portions of the resin roof are bent toward the vehicle upper side, are disposed within the groove portions of the outer panels. Therefore, the penetration of water into the gaps between the upper flange portions and the groove portions can be suppressed by setting the upper walls of the groove portions and the upper ends of the upper flange portions extremely close. Accordingly, it is difficult for the joined portions of the outer panels, that are joined to the inner surface of the resin roof, to be exposed to water, and a special waterproofing processing is not needed.

In accordance with the resin roof mounting structure of the fifth aspect relating to the present invention, concave portions, that are recessed further toward the vehicle lower side than the joined portions, are provided along the vehicle longitudinal direction at the lower portions of the groove portions that are shapes in which the vertical wall portions of the outer panels are recessed toward the vehicle transverse direction outer sides. In the unlikely event that water penetrates in from between the upper flange portions and the groove portions, the penetration of water into the joined portions can be suppressed more reliably at the concave portions. Further, the concave portions are provided along the vehicle longitudinal direction, and the water that has penetrated into the concave portions can be drained in the vehicle longitudinal direction.

Advantageous Effects of Invention

In accordance with the resin roof mounting structure relating to the present invention, joined portions of a resin roof and roof side rails being exposed to water can be suppressed.

BEST MODES FOR CARRYING OUT THE INVENTION

A first embodiment of a resin roof mounting structure relating to the present invention is described hereinafter by using FIG. 1 through FIG. 5. Note that arrow FR shown appropriately in these drawings indicates the vehicle front side, arrow UP indicates the vehicle upper side, and arrow OUT indicates the vehicle transverse direction outer side.

Figure 1:
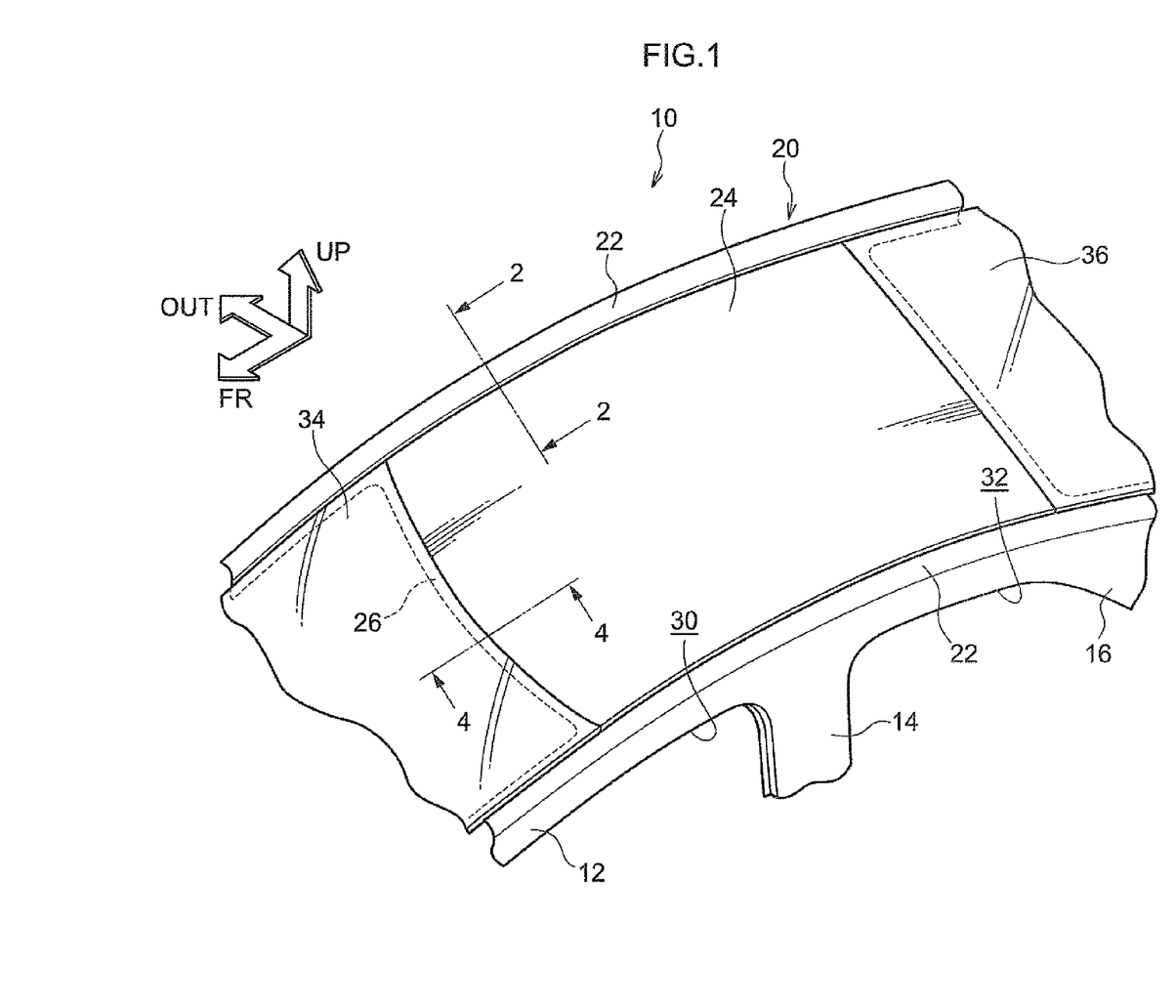
FIG. 1 is a perspective view showing the upper portion of a vehicle to which a resin roof mounting structure relating to a first embodiment is applied.
Figure 2:
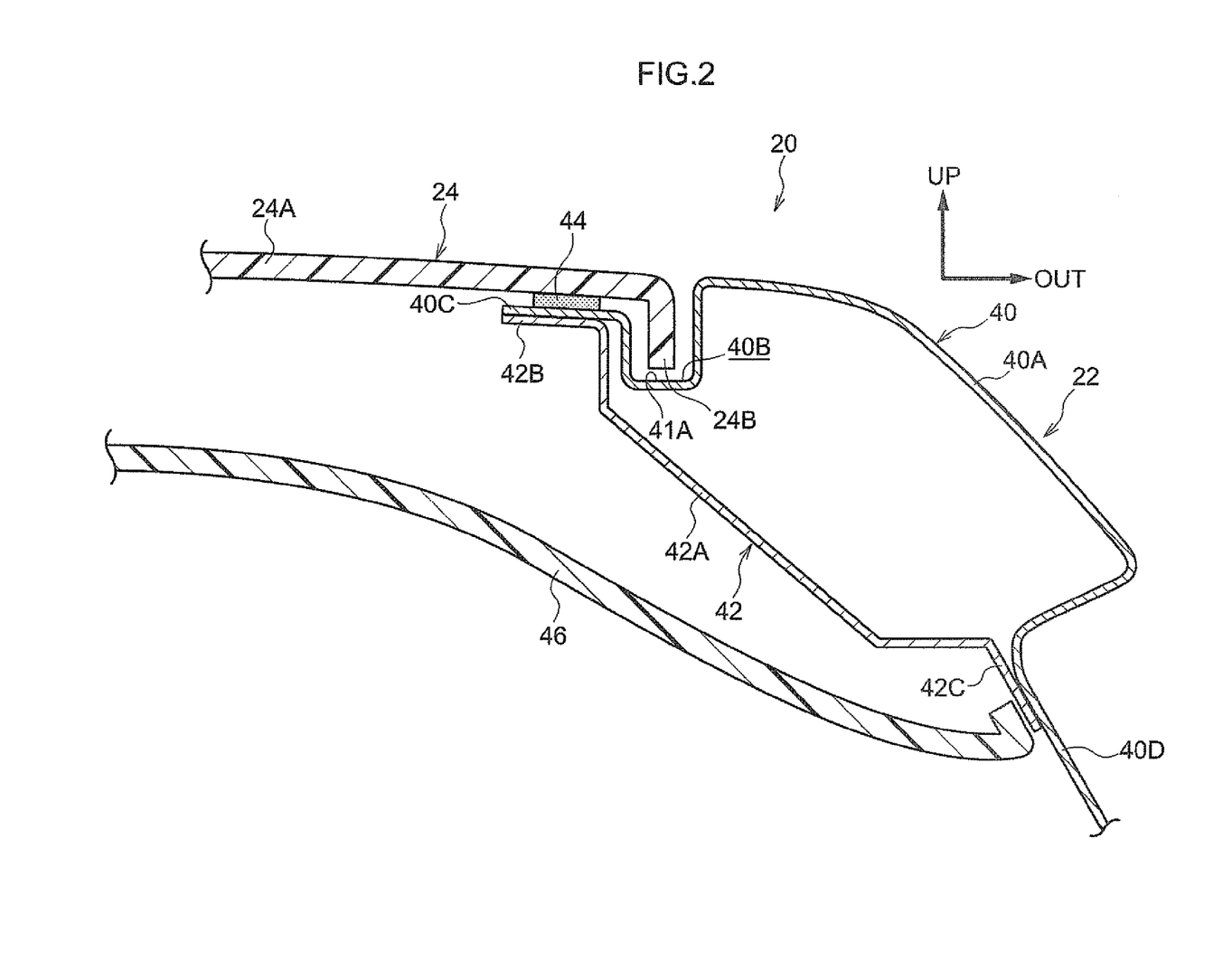
FIG. 2 is a vertical sectional view of the resin roof mounting structure along line 2-2 in FIG. 1.

The upper portion of a vehicle 10, to which a resin roof mounting structure 20 relating to the present embodiment is applied, is shown in a perspective view in FIG. 1. A vertical sectional view of the resin roof mounting structure 20 along line 2-2 in FIG. 1 is shown in FIG. 2. Further, a front end corner portion of a roof panel 24, that is used in the resin roof mounting structure 20, is shown in a perspective view in FIG. 3. As shown in FIG. 1, front pillars 12, center pillars 14 and rear pillars 16 are disposed in order from the vehicle front side at the side portions of the vehicle 10. Note that the front pillars 12, the center pillars 14 and the rear pillars 16 are provided as left and right pairs at the both sides of the vehicle 10. The resin roof mounting structure 20 is provided at the upper portion of the vehicle 10 that is at the upper side of the front pillars 12, the center pillars 14 and the rear pillars 16.

The resin roof mounting structure 20 has a pair of left and right roof side rails 22 that extend substantially along the vehicle longitudinal direction at both sides of the upper portion of the vehicle 10, and the roof panel (resin roof) 24 that is made of resin and that covers the region between the pair of left and right roof side rails 22. The roof panel 24 extends in the vehicle transverse direction and the vehicle longitudinal direction. A front roof header panel 26, that connects the front end portions of the roof side rails 22 in the vehicle transverse direction, and a rear roof header panel (not shown), that connects the rear end portions of the roof side rails 22 in the vehicle transverse direction, are provided at the vehicle inner side at the front end portion and the rear end portion of the roof panel 24.

The roof side rails 22 are respectively joined to the upper end portions of the front pillars 12, the center pillars 14 and the rear pillars 16, and are vehicle skeleton members that are disposed with the length directions thereof being substantially the vehicle longitudinal direction. The roof side rails 22 are formed so as to be curved such that, in a vehicle side view, the height of the vehicle longitudinal direction intermediate portions thereof is higher than the heights of the vehicle longitudinal direction both end portions thereof. Front side door opening portions 30, that are formed at the vehicle front sides of the center pillars 14, and rear side door opening portions 32, that are formed at the vehicle rear sides of the center pillars 14, are provided at the lower sides of the roof side rails 22 of the side portions of the vehicle 10. Further, a windshield glass 34 is provided between the front pillars 12 at the vehicle front side of the roof panel 24. A pop-up type back door 36, that is mounted to the rear roof header panel (not shown) between the rear pillars 16, is provided at the rear portion of the vehicle 10 at the vehicle rear side of the roof panel 24.

As shown in FIG. 2, the roof side rail 22 has an outer panel 40 that is disposed at the vehicle outer side, and an inner panel 42 that is disposed at the vehicle inner side. The outer panel 40 has a curved surface portion 40A that is formed such that the vehicle upper end corner portion curves in a convex shape toward the vehicle outer side, a groove portion 40B that is concave and is formed along the vehicle longitudinal direction at the vehicle transverse direction inner side of the curved surface portion 40A, an inner side flange portion (joined portion) 40C that is formed at the final end portion that is further toward the vehicle transverse direction inner side than the groove portion 40B, and an outer side inclined portion 40D that is formed so as to slope downward toward the vehicle side portion at the vehicle transverse direction outer side of the curved surface portion 40A. The groove portion 40B is formed in a substantial hat shape in cross-section that opens toward the vehicle upper side. The groove portion 40B projects-out into the closed cross-sectional portion of the roof side rail 22. The inner side flange portion 40C extends along the lateral direction (toward the vehicle transverse direction inner side), at a position that is higher than a bottom surface 41A of the groove portion 40B as seen in cross-sectional view. By providing the groove portion 40B along the vehicle longitudinal direction, water (rain water and the like), to which the roof panel 24 is exposed, is drained in the vehicle longitudinal direction from the groove portion 40B.

The inner panel 42 has a projecting portion 42A that projects-out toward the vehicle inner side, an inner side flange portion 42B that is formed in the lateral direction at the vehicle transverse direction inner side of the projecting-out portion 42A, and an outer side flange portion 42C that is formed in an oblique direction at the vehicle transverse direction outer side of the projecting portion 42A. The roof side rail 22 is formed to be a closed cross-sectional structure by joining the inner side flange portion 40C of the outer panel 40 and the inner side flange portion 42B of the inner panel 42, and by joining the outer side inclined portion 40D of the outer panel 40 and the outer side flange portion 42C of the inner panel 42.

As shown in FIG. 2, the roof panel 24 has an upper surface portion 24A that serves as a general portion and extends in the vehicle transverse direction and the vehicle longitudinal direction, and lower flange portions 24B that are disposed so as to be bent toward the vehicle lower side from the vehicle side end portions (the vehicle transverse direction outer side end portions) of the upper surface portion 24A. The lower flange portion 24B of the roof panel 24 is disposed at the interior of the groove portion 40B of the outer panel 40. The joined portion of the inner side flange portion 40C and the inner side flange portion 42B of the roof side rail 22 is joined (fixed) by using an adhesive 44 to the inner surface of the upper surface portion 24A of the roof panel 24. Further, the lower sides of the roof panel 24 and the roof side rails 22 are covered by a roof head lining 46 that serves as an interior material. By forming the inner side flange portion 40C at a position that is higher than the bottom surface 41A of the groove portion 40B, and by joining the inner side flange portion 40C and the inner surface of the upper surface portion 24A of the roof panel 24 by using the adhesive 44, the adhesive 44 being exposed to the water (rain water and the like) that flows through the groove portion 40B is suppressed (refer to FIG. 5B).

Figure 5A:
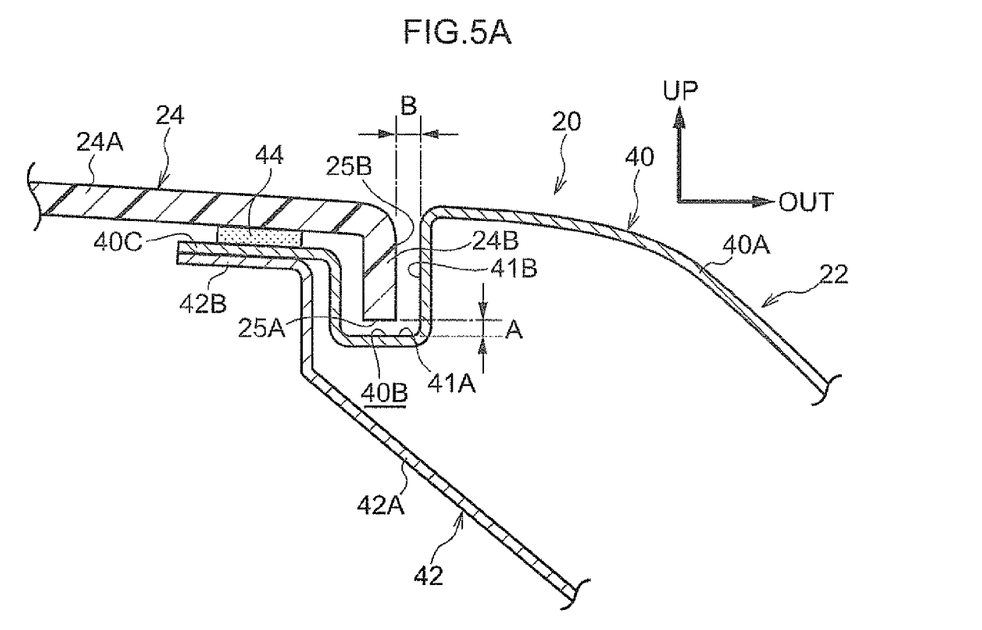
FIG. 5A is an enlarged vertical sectional view showing a flange portion of the roof panel and a vicinity of a groove portion of an outer panel, of the resin roof mounting structure shown in FIG. 2.

As shown in FIG. 5A, a gap A is provided between an end surface 25A of the lower end portion of the lower flange portion 24B and the bottom surface 41A of the groove portion 40B of the outer panel 40. Further, a gap B is provided between a wall surface 25B at the vehicle transverse direction outer side of the lower flange portion 24B and a wall surface 41B at the vehicle transverse direction outer side of the groove portion 40B of the outer panel 40. Note that a gap is provided also between the wall surface at the vehicle transverse direction inner side of the lower flange portion 24B and the wall surface at the vehicle transverse direction inner side of the groove portion 40B. Namely, by providing the gap A, that is in the vehicle vertical direction, and the gap B, that is in the vehicle transverse direction, and the like between the lower flange portion 24B and the groove portion 40B, the lower flange portion 24B of the roof panel 24 and the groove portion 40B of the outer panel 40 interfering with one another and abnormal noise arising are prevented. Further, by providing the gap B, that is in the vehicle transverse direction, and the like between the lower flange portion 24B and the groove portion 40B of the outer panel 40, the roof panel 24 can be installed on the roof side rails 22 from the vehicle upper side and the lower flange portions 24B can be inserted into the groove portions 40B, and the assembly of the roof panel 24 to the vehicle body is easy.

In this resin roof mounting structure 20, the vehicle transverse direction end portion of the roof panel 24 and the roof side rail 22 structure a parting between the parts, and other parts (decorative parts) such as a roof molding or the like are not set thereat. The mating surfaces (the parting portion) of the outer surface of the upper surface portion 24A of the roof panel 24 and the outer surface of the curved surface portion 40A of the outer panel 40 are substantially flush. Moreover, by making the gap B between the wall surface 25B of the lower flange portion 24B and the wall surface 41B of the groove portion 40B of the outer panel 40 be as small as possible, the appearance of the transverse direction end portion of the upper portion of the vehicle 10 is good.

Figure 3:
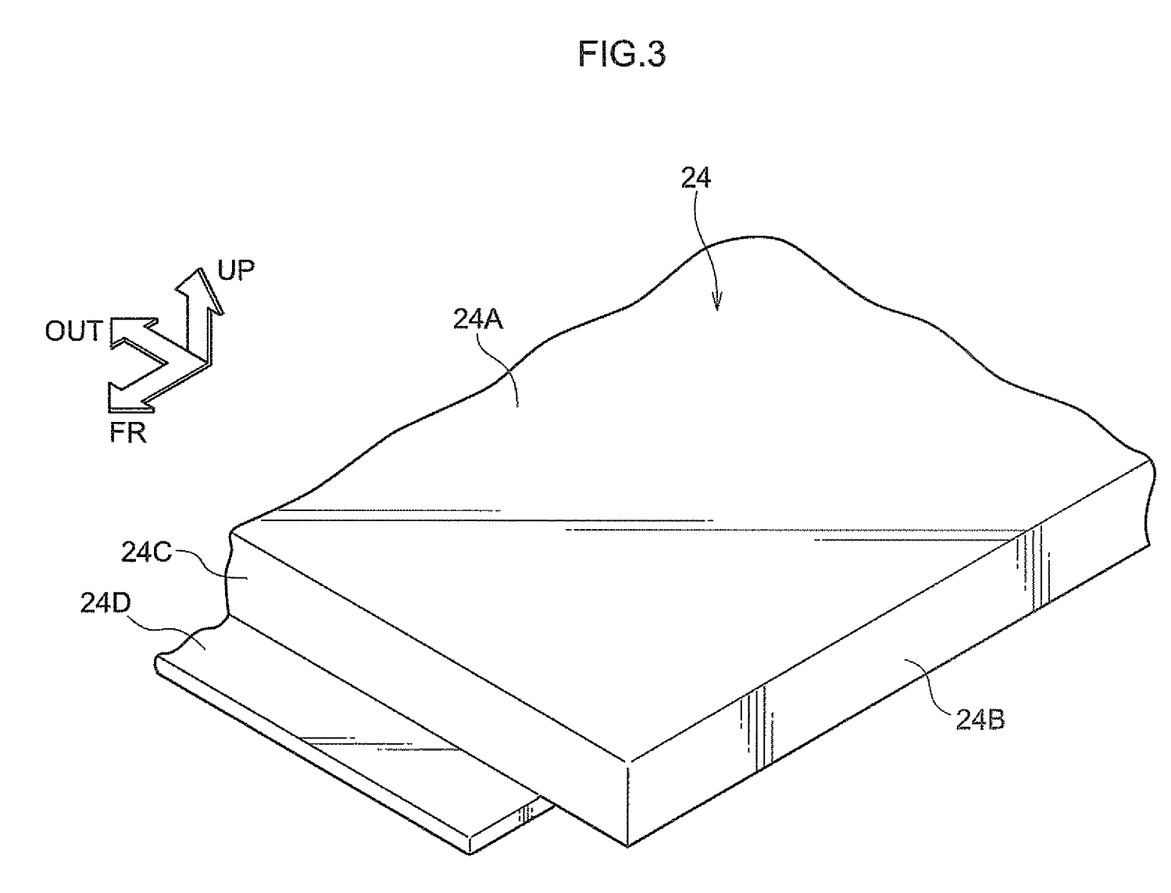
FIG. 3 is an enlarged perspective view showing a front corner portion of a roof panel that is used in the resin roof mounting structure relating to the first embodiment.

As shown in FIG. 3, a vertical wall portion 24C that is disposed from the front end of the upper surface portion 24A toward the vehicle lower side, and a lateral wall portion 24D that is disposed from the lower end of the vertical wall portion 24C toward the vehicle front side, are formed at the front end portion of the roof panel 24. The roof panel 24 is formed such that the lower flange portions 24B and the vertical wall portion 24C are continuous in substantially perpendicular directions, at the front end corner portions in the vehicle transverse direction. By providing the lower flange portions 24B and the vertical wall portion 24C at the roof panel 24 that is made of resin, the rigidity of the final ends of the roof panel 24 is ensured.

Figure 4:
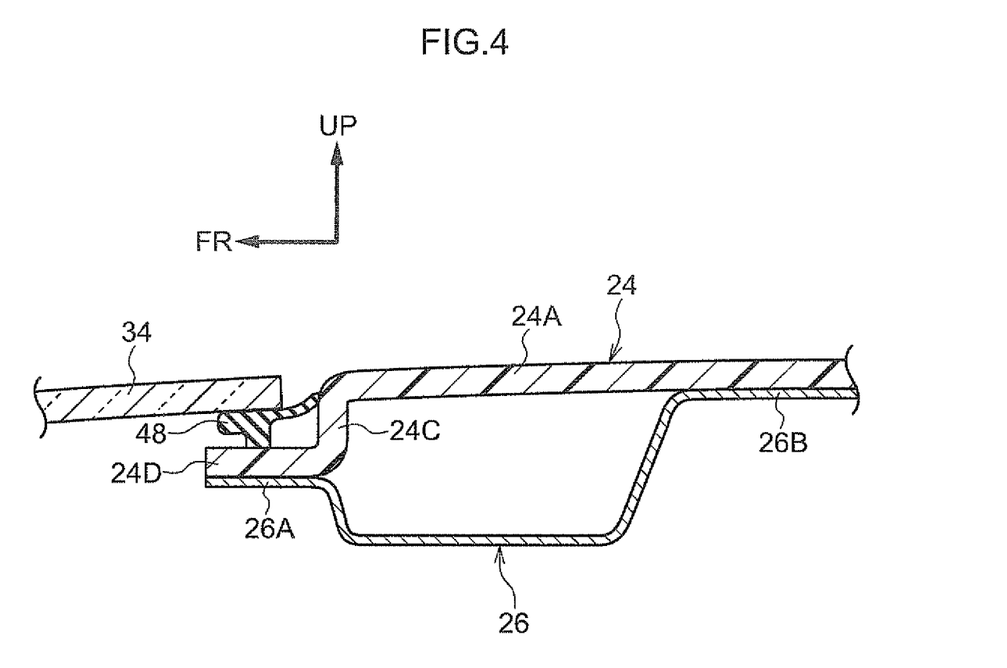
FIG. 4 is a vertical sectional view of the resin roof mounting structure along line 4-4 in FIG. 1.

As shown in FIG. 4, the front roof header 26, that is substantially hat-shaped in cross-section and whose vehicle upper side is open, is disposed at the lower side of the front end portion of the roof panel 24. The lateral wall portion 24D of the roof panel 24 is joined by an adhesive (not shown) to a front side end portion 26A of the front roof header panel 26, and the inner surface of the upper surface portion 24A of the roof panel 24 is joined by an adhesive (not shown) to a rear side end portion 26B of the front roof header panel 26. The windshield glass 34 is mounted to the outer surface of the lateral wall portion 24D of the roof panel 24 by using a sealing material 48.

Operation and effects of the present embodiment are described next.

Figure 5B:
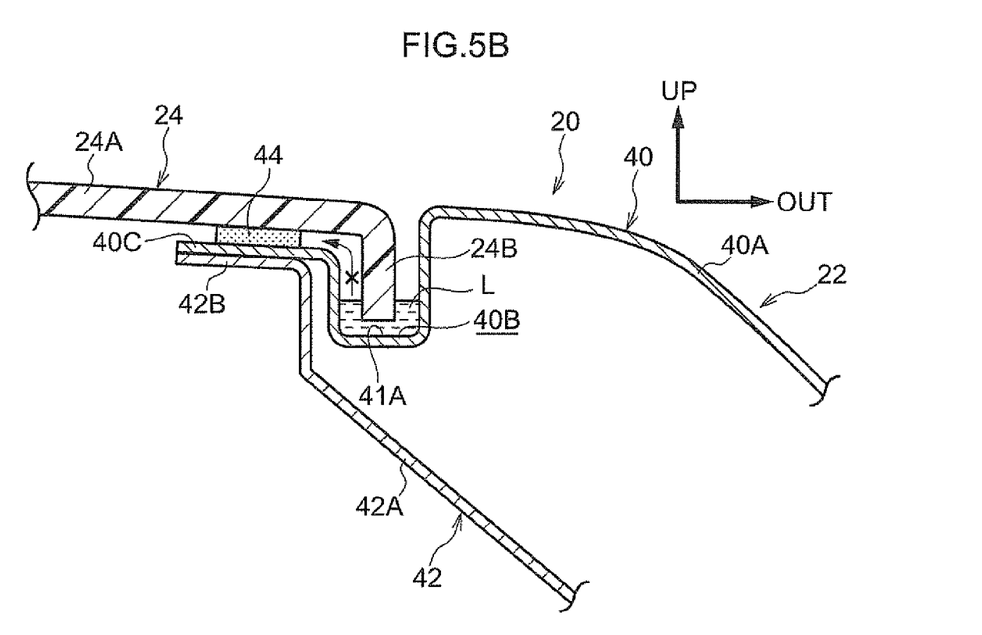
FIG. 5B is an enlarged vertical section view showing a state in which water has penetrated into the groove portion of the outer panel shown in FIG. 5A.

As shown in FIG. 2 and the like, in the state in which the lower flange portion 24B of the roof panel 24 is disposed at the interior of the groove portion 40B of the outer panel 40, the inner side flange portion 40C of the outer panel 40 and the inner surface of the upper surface portion 24A of the roof panel 24 are joined by using the adhesive 44. By providing the groove portion 40B along the vehicle longitudinal direction of the outer panel 40, as shown in FIG. 5B, water (rain water and the like), to which the upper surface portion 24A of the roof panel 24 is exposed, is drained in the vehicle longitudinal direction from the groove portion 40B (refer to water L in FIG. 5B). At this time, the inner side flange portion 40C and the upper surface portion 24A of the roof panel 24 are joined by the adhesive 44 further toward the vehicle transverse direction inner side than the groove portion 40B of the outer panel 40, and the inner side flange portion 40C is formed at a position that is higher than the bottom surface 41A of the groove portion 40B. It is difficult for the adhesive 44 to be exposed to the water L that flows through the groove portion 40B, and a special waterproofing processing (e.g., setting a part for sealing, or the like) is not needed.

Further, the vehicle transverse direction end portion of the roof panel 24 and the roof side rail 22 structure a parting between the parts, and another part (a decorative part) such as roof molding or the like is not set thereat. In the present embodiment, the lower flange portion 24B of the roof panel 24 is disposed at the interior of the groove portion 40B of the outer panel 40, and the mating surfaces (the parting portion) of the outer surface of the upper surface portion 24A of the roof panel 24 and the outer surface of the curved surface portion 40A of the outer panel 40 are substantially flush. Moreover, because the gap B between the wall surface 25B of the lower flange portion 24B and the wall surface 41B of the groove portion 40B of the outer panel 40 is small, the appearance of the transverse direction end portion of the upper portion of the vehicle 10 is good.

Further, by providing the gaps B, that are in the vehicle transverse direction, and the like between the lower flange portions 24B and the groove portions 40B of the outer panels 40, the roof panel 24 is installed on the roof side rails 22 from the vehicle upper side, and the lower flange portions 24B are inserted into the groove portions 40B, and the inner surface of the upper surface portion 24A of the roof panel 24 can be adhered by the adhesives 44 to the inner side flange portions 40C, and assembly of the roof panel 24 to the vehicle body is easy. Moreover, by providing the gaps A, that are in the vehicle vertical direction, and the gaps B, that are in the vehicle transverse direction, and the like between the lower flange portions 24B and the groove portions 40B of the outer panels 40, the lower flange portions 24B of the roof panel 24 and the groove portions 40B of the outer panels 40 interfering and abnormal noise being generated can be prevented.

Moreover, the rigidity of the final ends of the roof panel 24 that is made of resin is ensured by providing the lower flange portions 248 at the vehicle transverse direction end portions of the upper surface portion 24A and providing the vertical wall portion 24C and the like at the vehicle front end portion of the upper surface portion 24A. Namely, the rigidity can be ensured without making the plate thickness of the roof panel 24 thicker than needed, and therefore, as a result, the weight of the roof panel 24 can be lightened.

A second embodiment of a resin roof mounting structure relating to the present invention is described next by using FIG. 6 and FIG. 7. Note that, in the second embodiment, structural elements, members and the like that are the same as those of the firsts embodiment are denoted by the same reference numerals, and detailed description thereof is omitted.

Figure 6:
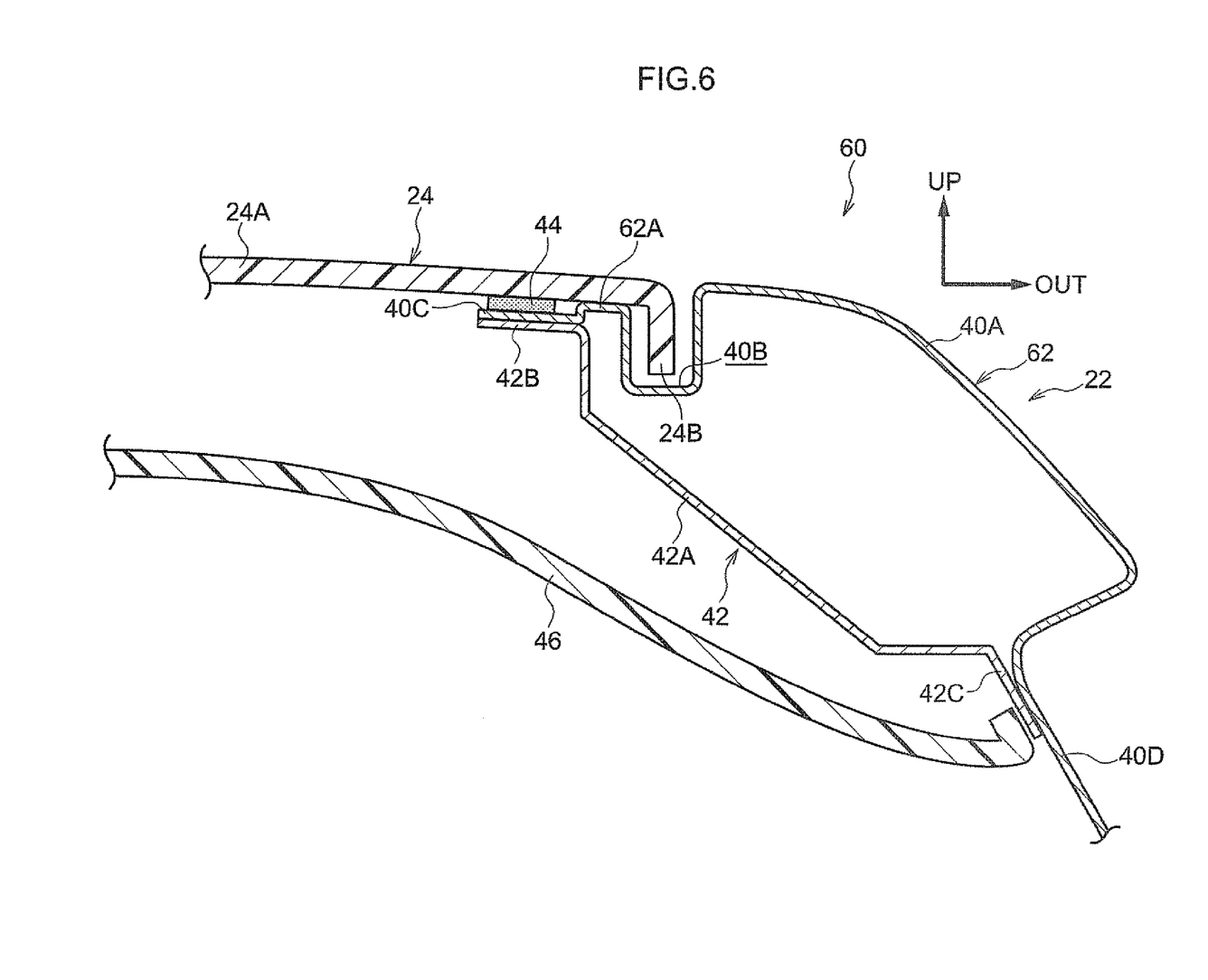
FIG. 6 is a vertical sectional view showing a resin roof mounting structure relating to a second embodiment.

As shown in FIG. 6, in a resin roof mounting structure 60, an outer panel 62 of the roof side rail 22 differs from the structure of the first embodiment. The outer panel 62 has, between the groove portion 40B and the inner side flange portion 40C in the vehicle transverse direction, an abutment portion (abutment surface) 62A that is convex and projects-out toward the vehicle upper side and abuts the inner surface of the upper surface portion 24A of the roof panel 24. The abutment portion 62A is provided along the vehicle longitudinal direction, at a position adjacent to the groove portion 40B. The top surface of the abutment portion 62A is formed in a substantially planar shape and is disposed in a state of planarly-contacting the upper surface portion 24A of the roof panel 24, and, in this state, the inner side flange portion 40C and the inner surface of the upper surface portion 24A of the roof panel 24 are joined by using the adhesive 44.

Figure 7:
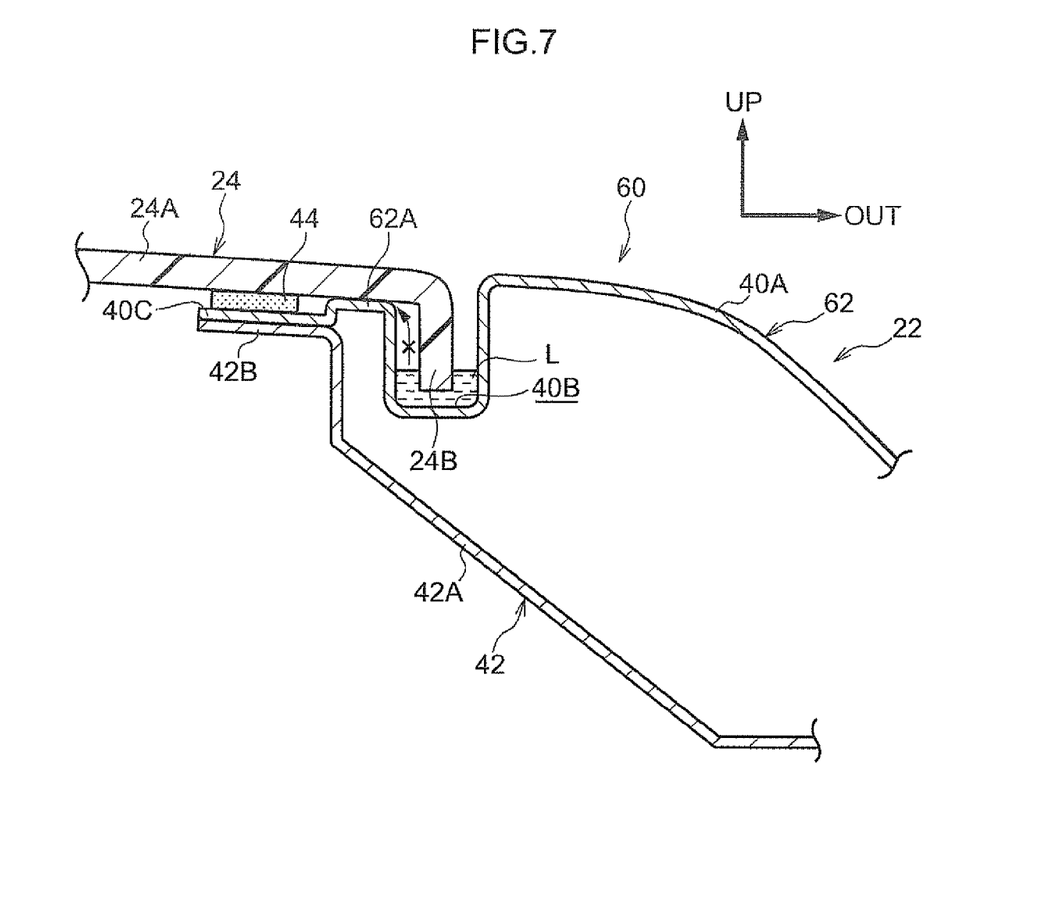
FIG. 7 is an enlarged vertical sectional view showing a state in which water has penetrated into the groove portion of an outer panel of the resin roof mounting structure shown in FIG. 6.

In this resin roof mounting structure 60, as shown in FIG. 7, the abutment portion 62A that is convex is formed further toward the vehicle transverse direction inner side than the groove portion 40B of the outer panel 62, and the upper surface portion 24A of the roof panel 24 is joined by the adhesive 44 to the inner side flange portion 40C that is further toward the vehicle transverse direction inner side than the abutment portion 62A, and the water L that flows within the groove portion 40B crossing-over the abutment portion 62A and penetrating into the inner side flange portion 40C is suppressed. Therefore, even in cases in which the water L that flows in the groove portion 40B increases, the adhesive 44 being exposed to the water L can be suppressed more effectively, without setting a special waterproofing processing (e.g., setting a part for sealing, or the like).

Further, the interval (adhesion surface interval) between the top surface of the inner side flange portion 40C and the inner surface of the upper surface portion 24A of the roof panel 24 can be adjusted by appropriately setting the step (the height dimensions) of the inner side flange portion 40C and the abutment portion 62A of the outer panel 62. Therefore, the thickness of the adhesive 44 can be controlled by the abutment portion 62, and the adhesive 44 bulging-out from between the inner side flange portion 40C and the upper surface portion 24A of the roof panel 24 at the time of adhesion can be avoided.

A third embodiment of a resin roof mounting structure relating to the present invention is described next by using FIG. 8 and FIG. 9. Note that, in the third embodiment, structural elements, members and the like that are the same as those of the first and second embodiments are denoted by the same reference numerals, and detailed description thereof is omitted.

Figure 8:
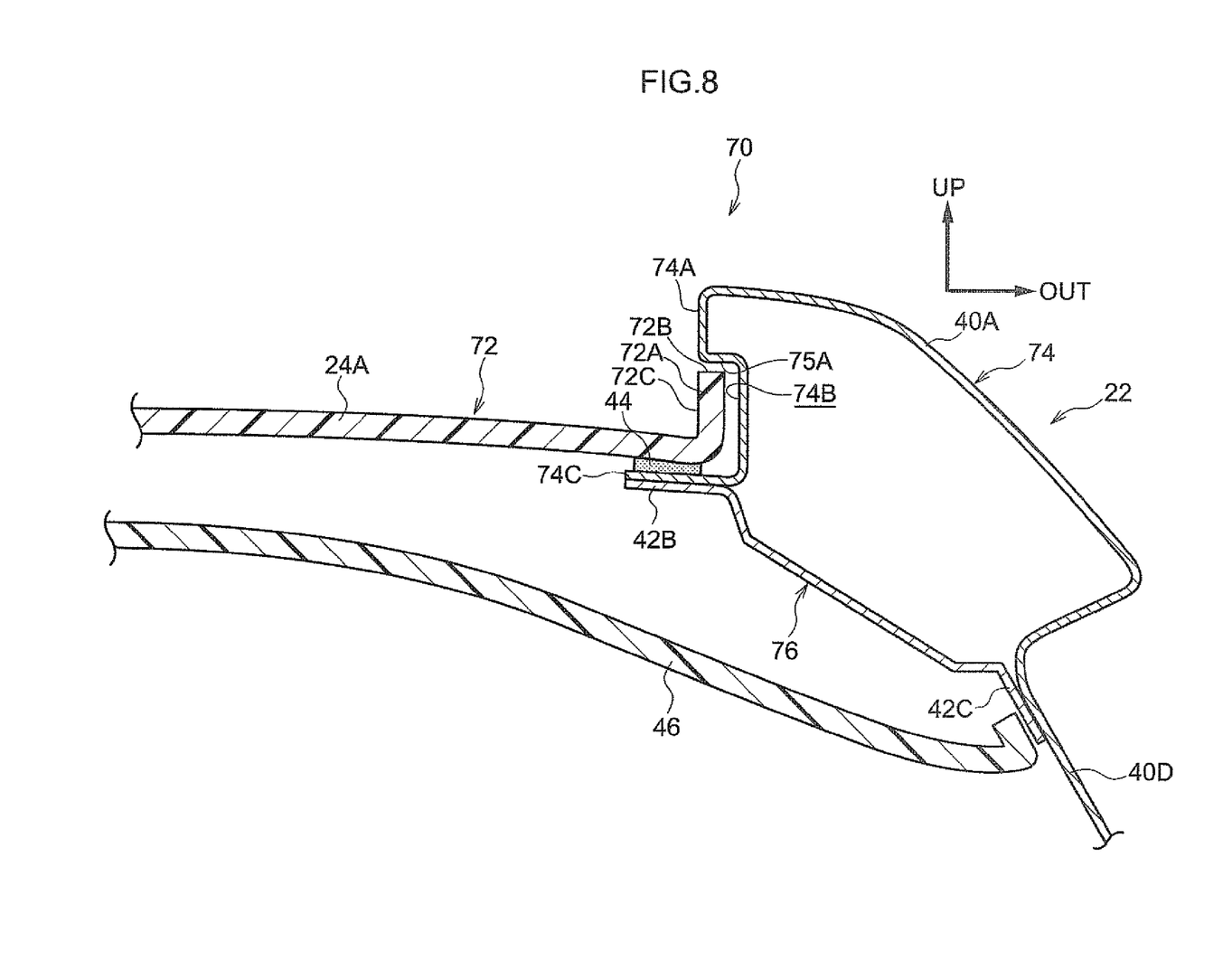
FIG. 8 is a vertical sectional view showing a resin roof mounting structure relating to a third embodiment.
Figure 9:
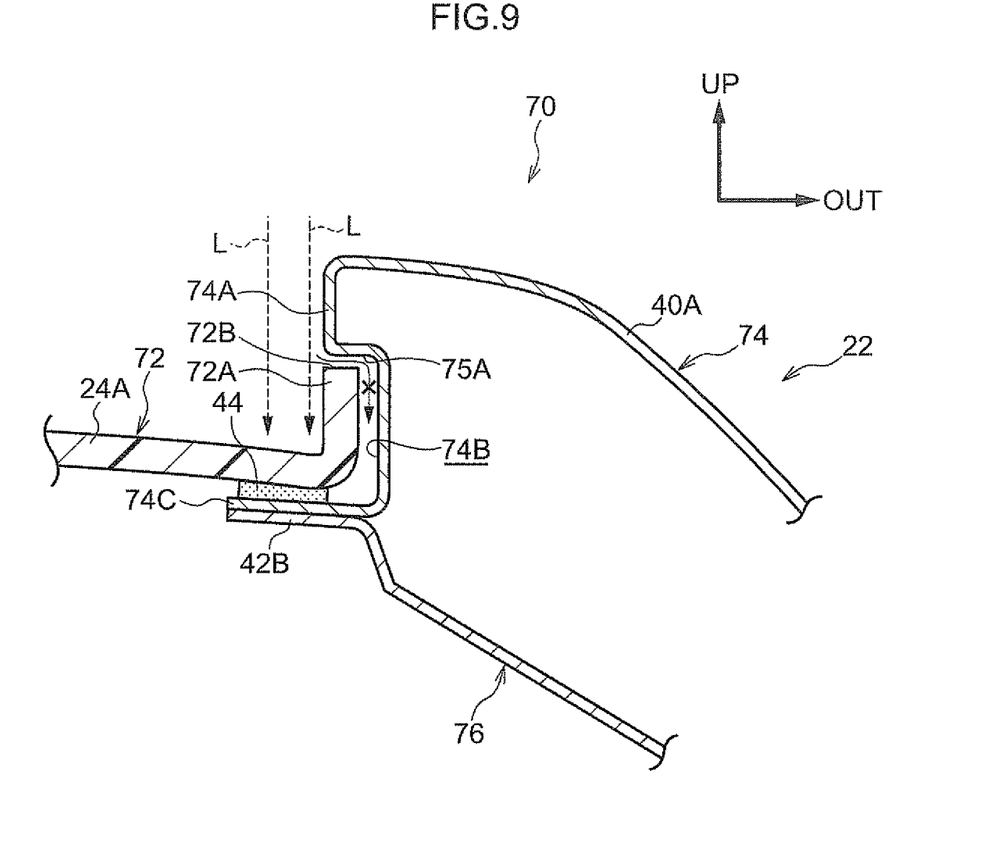
FIG. 9 is an enlarged vertical sectional view explaining a state in which an outer panel of the resin roof mounting structure shown in FIG. 8 is exposed to water from a vehicle upper side.

As shown in FIG. 8, in a resin roof mounting structure 70, a roof panel (resin roof) 72 that is made of resin has an upper flange portion 72A that is formed so as to be bent toward the vehicle upper side from the vehicle side portion (the vehicle transverse direction outer side end portion) of the upper surface portion 24A.

The roof side rail 22 has an outer panel 74 that is disposed at the vehicle outer side, and an inner panel 76 that is disposed at the vehicle inner side. The outer panel 74 has a vertical wall portion 74A that is disposed from the vehicle transverse direction inner side end portion of the curved surface portion 40A toward the vehicle lower side, a groove portion 74B that is recessed toward the vehicle transverse direction outer side from the lower end portion of the vertical wall portion 74A, and an inner side flange portion (joined portion) 74C that extends toward the vehicle transverse direction inner side from the lower wall of the groove portion 74B. The groove portion 74B is formed along the vehicle longitudinal direction. The roof side rail 22 is formed to be a closed cross-sectional structure by joining the inner side flange portion 74C of the outer panel 74 and the inner side flange portion 42B of the inner panel 76, and by joining the outer side inclined portion 40D of the outer panel 74 and the outer side flange portion 42C of the inner panel 76.

The upper flange portion 72A of the roof panel 72 is disposed at the interior of the groove portion 74B of the outer panel 74, and is structured such that the upper flange portion 72A is covered in the vertical direction by the groove portion 74B. In this state, the inner surface of the upper surface portion 24A of the roof panel 72 is joined (fixed) from above to the inner side flange portion 74C of the outer panel 74, by using the adhesive 44. In the present embodiment, an upper wall 75A of the groove portion 74B and an upper end surface 72B of the upper flange portion 72A are set as close as possible by appropriately setting the height of the upper flange portion 72A from the bottom surface of the upper surface portion 24A and the width of the groove portion 74B in the vertical direction. Further, the mating surfaces (the parting portion) of a wall surface 72C at the vehicle inner side of the upper flange portion 72A and the vertical wall portion 74A of the outer panel 74 are substantially flush.

In this resin roof mounting structure 70, penetration of water into the gap between the upper flange portion 72A and the groove portion 74B is suppressed by setting the upper wall 75A of the groove portion 74B and the upper end surface 72B of the upper flange portion 72A as close as possible. Therefore, as shown in FIG. 9, the water L (rain water and the like) from the vehicle upper side flows on the upper surface portion 24A of the roof panel 72 without crossing-over the upper flange portion 72A. Due thereto, the adhesive 44, that joins the inner side flange portion 74C of the outer panel 74 and the inner surface of the upper surface portion 24A of the roof panel 72, being exposed to water is suppressed, and a special waterproofing processing (e.g., setting a part for sealing, or the like) is not needed.

Further, the rigidity of the roof panel 72 that is made of resin is ensured by providing the upper flange portion 72A at the vehicle side end portion (the vehicle transverse direction outer side end portion) of the upper surface portion 24A. Further, the vehicle transverse direction end portion of the roof panel 72 and the roof side panel 22 structure a parting between the parts, and another part (a decorative part) such as a roof molding or the like is not set thereat. The upper wall 75A of the groove portion 74B and the upper end surface 72B of the upper flange portion 72A are set as close as possible, and the mating surfaces of the wall surface 72C at the vehicle inner side of the upper flange portion 72A and the vertical wall portion 74A of the outer panel 74 are substantially flush, and the appearance of the transverse direction end portion of the vehicle upper portion is good.

Moreover, gaps in the vehicle vertical direction and the vehicle transverse direction are provided between the upper flange portion 72A and the groove portion 74B of the outer panel 74, and the upper flange portion 72A and the groove portion 74B interfering and abnormal noise being generated can be prevented.

A fourth embodiment of a resin roof mounting structure relating to the present invention is described next by using FIG. 10. Note that, in the fourth embodiment, structural elements, members and the like that are the same as those of the first through third embodiments are denoted by the same reference numerals, and detailed description thereof is omitted.

Figure 10:
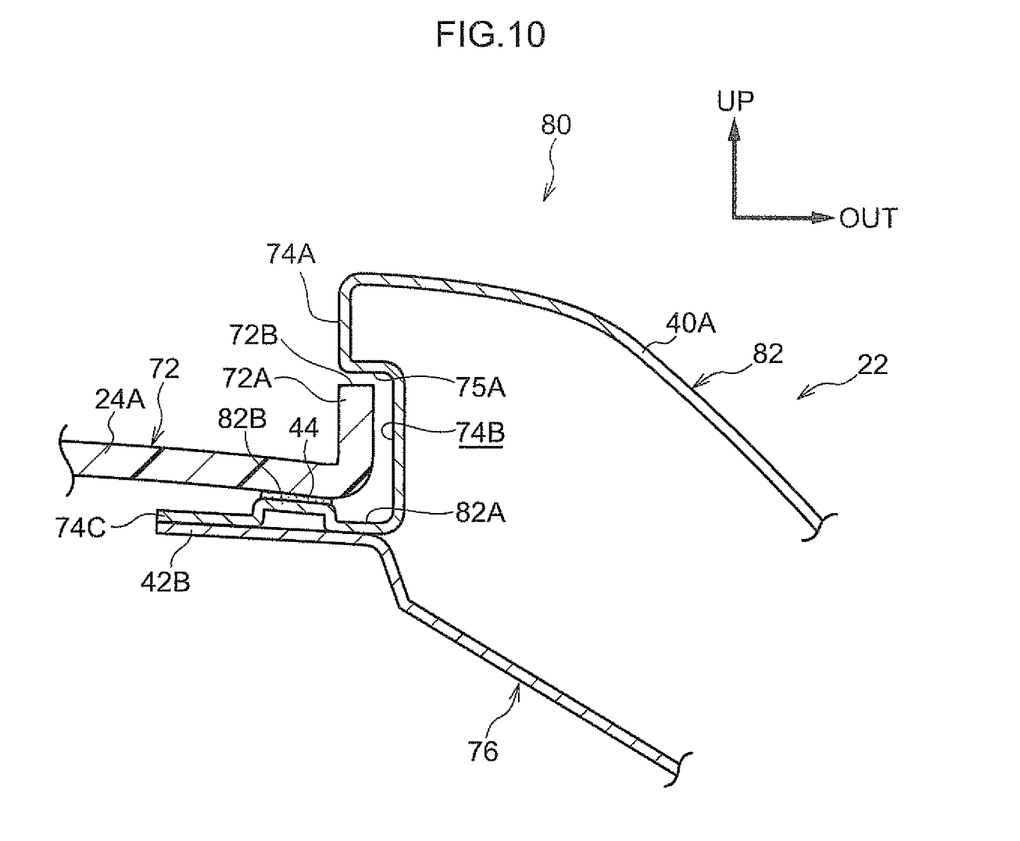
FIG. 10 is an enlarged vertical sectional view showing a flange portion of a roof panel and a vicinity of a groove portion of an outer panel, of a resin roof mounting structure relating to a fourth embodiment.

As shown in FIG. 10, in a resin roof mounting structure 80, an outer panel 82 of the roof side rail 22 differs from the structure of the third embodiment. A concave portion 82A, that is concave toward the vehicle lower side, is formed at the outer panel 82 at the lower portion of the groove portion 74B.

A planar portion (joined portion) 82B, that projects-out toward the vehicle upper side, is formed between the concave portion 82A and the inner side flange portion 74C in the vehicle transverse direction. The concave portion 82A and the planar portion 82B are formed along the vehicle longitudinal direction, and the planar portion 82B and the inner surface of the upper surface portion 24A of the roof panel 72 are joined (fixed) by using the adhesive 44.

In this resin roof mounting structure 80, in the unlikely event that water were to penetrate in from the gap between the upper end surface 72B of the upper flange portion 72A and the upper wall 75A of the groove portion 74B, the water would be drained in the vehicle longitudinal direction from the concave portion 82A. Further, the planar portion 82B, that is provided at a position that is higher than the bottom surface of the concave portion 82A, is joined to the inner surface of the upper surface portion 24A of the roof panel 72 by the adhesive 44. Therefore, the adhesive 44 being exposed to water can be suppressed more effectively.

Further, in this resin roof mounting structure 80, the planar portion 82B is joined to the inner surface of the upper surface portion 24A of the roof panel 72 by the adhesive 44. However, instead of this, there may be a structure in which the inner side flange portion 74C and the inner surface of the upper surface portion 24A of the roof panel 72 are joined by an adhesive in a state in which the planar portion 82B is made to abut the inner surface of the upper surface portion 24A of the roof panel 72. Due to this structure, water crossing-over the planar portion 82B and penetrating is suppressed, and it becomes even more difficult for the adhesive to be exposed to water.

Note that, in the first and second embodiments, the dimensions of the lower flange portion 24B, and the dimensions, shape and the like of the groove portion 40B, can be changed appropriately within a scope that does not deviate from the gist of the present invention.

Note that, in the third and fourth embodiments, the dimensions of the upper flange portion 72A, and the dimensions, shape and the like of the groove portion 74B, can be changed appropriately within a scope that does not deviate from the gist of the present invention.

DESCRIPTION OF REFERENCE NUMERALS 10 vehicle
20 resin roof mounting structure
22 roof side rail
24 roof panel (resin roof)
24B lower flange portion
40 outer panel
40B groove portion
40C inner side flange portion (joined portion)
44 adhesive
60 resin roof mounting structure
62 outer panel
62A abutment portion (abutment surface)
70 resin roof mounting structure
72 roof panel (resin roof)
72A upper flange portion
74 outer panel
74A vertical wall portion
74B groove portion
74C inner side flange portion (joined portion)
80 resin roof mounting structure
82 outer panel
82A concave portion
82B planar portion (joined portion)

The invention claimed is:

1. A resin roof mounting structure comprising:
a resin roof that is provided at a vehicle upper portion along a vehicle transverse direction and a vehicle longitudinal direction, and that has, at vehicle side portion final ends, flange portions that are bent toward a vehicle lower side or a vehicle upper side;
roof side rails that are provided at upper end portions of vehicle side portions, and that extend in the vehicle longitudinal direction along side end portions of the resin roof;
groove portions that are concave and are provided along the vehicle longitudinal direction at vehicle transverse direction inner side end portions of outer panels that structure the roof side rails, the flange portions being disposed within the groove portions;
joined portions that are provided at final end portions of the outer panels, which final end portions are further toward vehicle transverse direction inner sides than the groove portions, and that are joined to an inner surface of the resin roof in a state in which the flange portions are disposed within the groove portions; and
abutment surfaces that are provided between the groove portions and the joined portions in the vehicle transverse direction of the outer panels, that project out toward the vehicle upper side, and that abut the inner surface of the resin roof.

2. The resin roof mounting structure of claim 1, wherein
the flange portions are lower flange portions at which vehicle side end portions of the resin roof are bent toward the vehicle lower side, and
the groove portions are shaped, in cross-section, as hats at which the outer panels are recessed toward the vehicle lower side.

3. The resin roof mounting structure of claim 1, wherein
the flange portions are upper flange portions at which vehicle side end portions of the resin roof are bent toward the vehicle upper side, and
the groove portions are shapes in which vertical wall portions, that are provided at the outer panels, are recessed toward vehicle transverse direction outer sides.

4. The resin roof mounting structure of claim 3, wherein concave portions, that are recessed further toward the vehicle lower side than the joined portions, are provided along the vehicle longitudinal direction at lower portions of the groove portions.

* * * * *